United States Patent
Ooya (10) Patent No.: US 8,552,514 B2
(45) Date of Patent: Oct. 8, 2013

(54) SEMICONDUCTOR PHYSICAL QUANTITY SENSOR

(75) Inventor: Kouji Ooya, Anjo (JP)

(73) Assignee: Denso Corporation, Kariya-city (JP)

(*) Notice: Subject to any disclaimer, the term of this patent is extended or adjusted under 35 U.S.C. 154(b) by 138 days.

(21) Appl. No.: 13/165,827

(22) Filed: Jun. 22, 2011

(65) Prior Publication Data

US 2012/0001278 A1 Jan. 5, 2012

(30) Foreign Application Priority Data

Jul. 2, 2010 (JP) .................... 2010-152189

(51) Int. Cl.
*H01L 29/84* (2006.01)

(52) U.S. Cl.
USPC .................... 257/419; 257/E29.324

(58) Field of Classification Search
USPC .......................... 257/419, E29.324
See application file for complete search history.

(56) References Cited

U.S. PATENT DOCUMENTS

| 5,483,106 A | 1/1996 | Echigo et al. |
| 2006/0288793 A1 | 12/2006 | Tanaka |
| 2008/0190209 A1 | 8/2008 | Baba |
| 2009/0026558 A1 | 1/2009 | Bauer et al. |

FOREIGN PATENT DOCUMENTS

| EP | 0 552 567 A1 | 1/1993 |
| JP | A-59-123276 | 7/1984 |
| JP | H3-13832 A | 1/1991 |
| JP | A-07-321344 | 12/1995 |
| JP | 10060403 | * 3/1998 |
| JP | A-10-170367 | 6/1998 |
| JP | H10-300605 A | 11/1998 |
| JP | H10-325770 A | 12/1998 |
| JP | A-11-108782 | 4/1999 |
| JP | B2-3077382 | 6/2000 |
| JP | A-2002-318165 | 10/2002 |
| JP | A-2004-163148 | 6/2004 |
| JP | B2-3921820 | 3/2007 |
| JP | B2-4193160 | 10/2008 |
| JP | 2009-227758 A | 10/2009 |

OTHER PUBLICATIONS

Notification of Reasons for Refusal mailed on Mar. 5, 2013 by the Japanese Patent Office in the corresponding Japanese patent application No. 2010-152189 (and English translation).
Decision of Rejection mailed Apr. 30, 2013 in the corresponding Japanese application 2010-152189.
Office Action mailed Jun. 25, 2013 issued in the corresponding CN application No. 201110189222.9 (English translation).

* cited by examiner

*Primary Examiner* — Long Pham
(74) *Attorney, Agent, or Firm* — Posz Law Group, PLC (57) ABSTRACT

A semiconductor physical quantity sensor includes a sensor chip, a support member for fixing the sensor chip to a fixing position and an adhesive bonding the sensor chip with the support member. The sensor chip includes a semiconductor substrate and a chip base supporting the semiconductor substrate. The semiconductor substrate is provided with a sensing portion for detecting a physical quantity. The chip base is bonded with the support member through the adhesive. The adhesive is provided by a mixture of an adhesive base material mainly made of a resin and a granular material mainly made of a cross-linked resin.

10 Claims, 6 Drawing Sheets

SEMICONDUCTOR PHYSICAL QUANTITY SENSOR

CROSS REFERENCE TO RELATED APPLICATION

This application is based on Japanese Patent Application No. 2010-152189 filed on Jul. 2, 2010, the disclosure of which is incorporated herein by reference.

FIELD OF THE INVENTION

The present invention relates to a semiconductor physical quantity sensor for detecting a physical quantity. More particularly, the present invention relates to a semiconductor physical quantity sensor having a sensor chip bonded with a support member through an adhesive.

BACKGROUND OF THE INVENTION

For example, Japanese Patent Application Publication No. 10-170367 describes a semiconductor pressure sensor having a sensor chip bonded with a package material through an adhesive. The sensor chip includes a semiconductor substrate provided with a diaphragm and a base supporting a bottom surface of the semiconductor substrate. The base is bonded with the package material through the adhesive, The adhesive contains microbeads so as to reduce an effect of thermal hysteresis.

In the pressure sensor, if the microbeads are unevenly distributed in the adhesive, a temperature property line of offset of a sensor output is curved. In such a case, it is difficult to improve detection accuracy. Also, it is difficult to correct the curve of the temperature property line by an electronic circuit provided in the sensor.

SUMMARY OF THE INVENTION

The present invention is made in view of the foregoing matter, and it is an object of the present invention to provide a physical quantity sensor capable of reducing the curve of a temperature property line.

According to an aspect of the present invention, a semiconductor physical quantity sensor includes a sensor chip, a support member for supporting the chip base and an adhesive. The sensor chip includes a semiconductor substrate and a chip base supporting the semiconductor substrate. The semiconductor substrate is provided with a sensing portion for detecting a physical quantity. The chip base is bonded with the support member through the adhesive. The adhesive is provided by a mixture of an adhesive base material mainly made of a resin and a granular material mainly made of a cross-linked resin.

By the above adhesive, the curve of the temperature property line, such as a curve of a temperature property line of offset of a sensor output, can be reduced, and hence detection accuracy improves.

For example, the cross-linked resin is one of cross-linked polyacrylic acid ester, acrylonitrile-base resin, and phenol resin.

For example, the granular material includes one of solid spherical particles and hollow spherical particles.

For example, the adhesive base material of the adhesive is mainly made of a rubber-base element, such as silicone rubber, fluorosilicone rubber, or fluororubber.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EXEMPLARY EMBODIMENTS

Exemplary embodiments of the present invention will be described hereinafter with reference to the drawings. In one exemplary embodiment, the semiconductor physical quantity sensor is exemplarily employed as a semiconductor pressure sensor.

<General Structure>

First, a structure of the semiconductor pressure sensor will be described.

Figure 1:
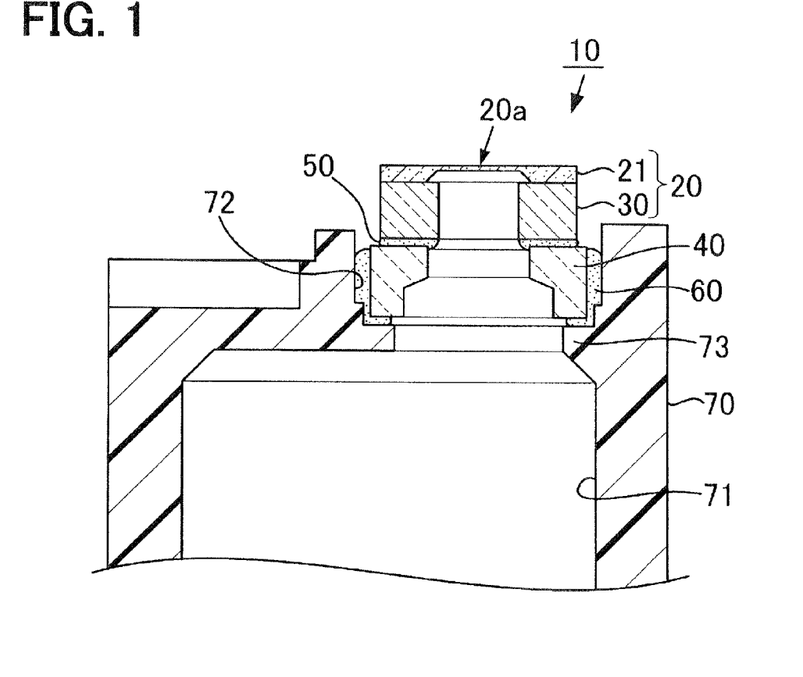
FIG. 1 is a schematic cross-sectional view of a semiconductor pressure sensor according to an embodiment of the present invention.
Figure 2:
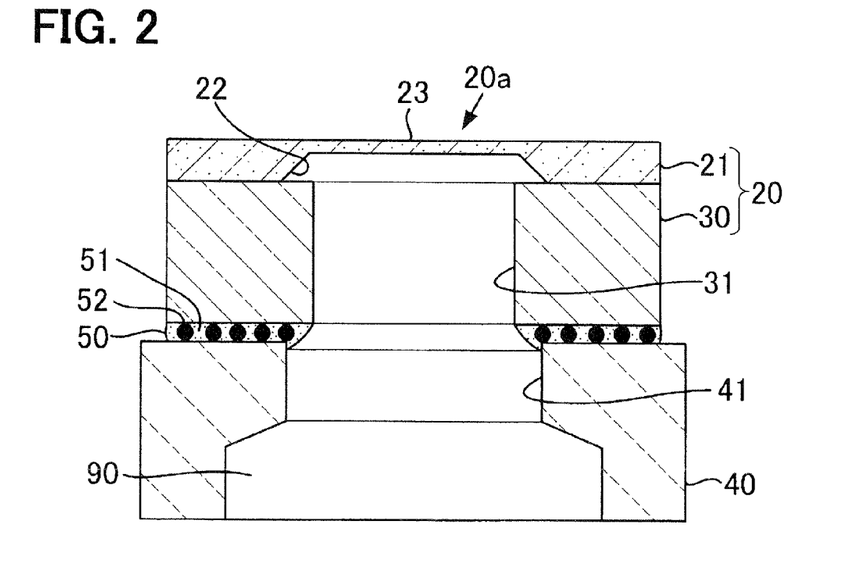
FIG. 2 is an enlarged cross-sectional view of a part of the semiconductor pressure sensor according to the embodiment.
Figure 3A:
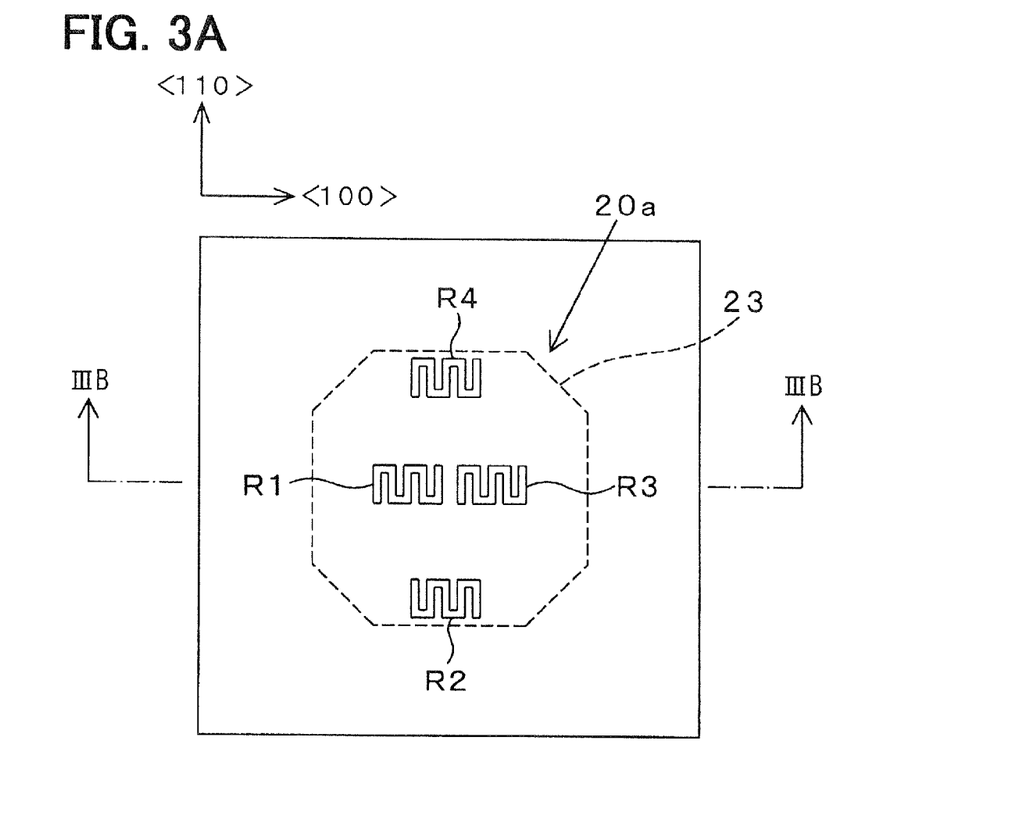
FIG. 3A is a plan view of a sensor chip of the semiconductor pressure sensor according to the embodiment.
Figure 3B:
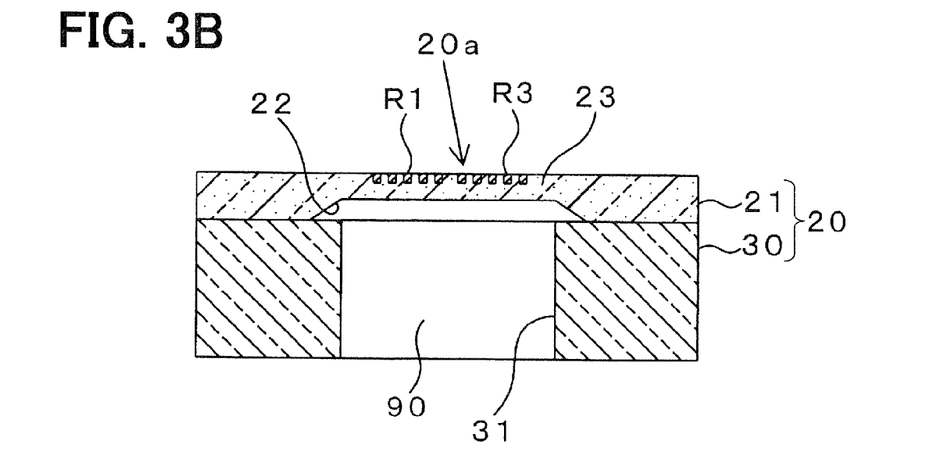
FIG. 3B is a schematic cross-sectional view taken along a line IIIB-IIIB in FIG. 3A.
Figure 4:
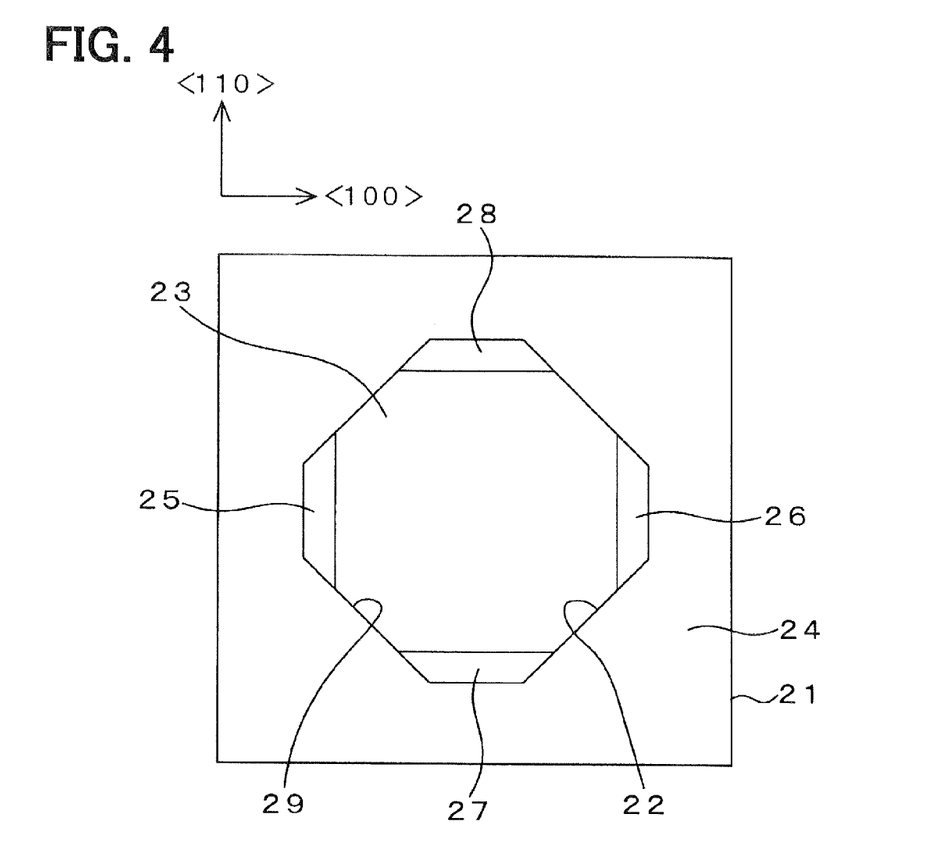
FIG. 4 is a bottom plan view of the sensor chip shown in FIGS. 3A and 3B.

FIG. 1 is a schematic cross-sectional view of a pressure sensor 10, and FIG. 2 is an enlarged cross-sectional view of the pressure sensor 10 in which a case 70 shown in FIG. 1 is removed. FIG. 3A is a plan view of a sensor chip 20, and FIG. 3B is a schematic cross-sectional view taken along a line IIIB-IIIB in FIG. 3A. FIG. 4 is a bottom plan view of the sensor chip 20 shown in FIGS. 3A and 3B.

Referring to FIG. 1, the pressure sensor 10 includes the sensor chip 20, a stem 40 and the case 70. The sensor chip 20 includes a single-crystal silicon substrate 21 and a chip base 30 supporting a bottom surface of the silicon substrate 21. The chip base 30 is, for example, made of glass. The silicon substrate 21 is provided with a sensing portion 20a.

The stem 40 supports a bottom surface of the base 30 through a chip adhesive 50. The stem 40 serves as a support member for supporting the sensor chip 20 and for fixing the sensor chip 20 to a fixing location. The stem 40 is, for example, made of ceramic. The stem 40 is supported by the case 70 through a stem adhesive 60. The case 70 is, for example, made of resin.

The case 70 is formed with a case communication hole 71. The case communication hole 71 passes through the case 70 in an up and down direction in FIG. 1. The case 70 has a projection 73 projecting inwardly from an inner surface that forms the case communication hole 71, For example, the projection 73 has a step shape.

The stem 40 is bonded with an upper inner surface 72 of the case 70 and a surface of the projection 73 through the stem adhesive 60. The upper inner surface 72 is located adjacent to an upper end of the case 70. The surface of the projection with which the stem 40 is bonded faces upward. The upper inner surface 72 and the projection 73 correspond to the fixing location to which the stem 40 is fixed.

As shown in FIG. 2, the silicon substrate 21 has a recess 22 on a bottom surface 24 that faces the chip base 30. The sensing portion 20a is formed at the bottom surface of the recess 22.

The base 30 is formed with a base communication hole 31. The base communication hole 31 passes through the base 30 in the up and down direction. The base communication hole 31 is in communication with the recess 22.

The stem 40 is formed with a stem communication hole 41. The stem communication hole 41 passes through the stem 40 in the up and down direction. The stem communication hole 41 is in communication with the base communication hole 31. For example, the communication holes 71, 41, 31 and the recess 22 may be filled with a pressure transmitting medium, such as fluorosilicone gel, depending on the use of the pressure sensor 10.

As shown in FIG. 3A, the sensing portion 20a is constructed of a diaphragm 23 and strain gauge resistors R1 through R4. The diaphragm 23 has an octagonal shape. The strain gauge resistors R1 through R4 are disposed on the diaphragm 23. When the silicon substrate 21 is viewed from the bottom surface 24, as shown in FIG. 4, the diaphragm 23 is exposed from the recess 22. The bottom surface 24 of the silicon substrate 21 forms a (110)-face in a plane orientation.

The recess 22 forms an octagonal opening provided by tapered surfaces 25 through 28 and vertical surfaces 29 between the tapered surfaces 25 through 28. In forming the recess 22 on the bottom surface 24, a mask with an octagonal opening is deposited on the (110)-face of the silicon substrate 21, and an anisotropic etching is carried out using the mask. The tapered surface 25 is opposed to the tapered surface 26 with respect to a direction parallel to a crystal axis of <100>. The tapered surface 27 is opposed to the tapered surface 28 with respect to a direction parallel to a crystal axis of <110>. The tapered surfaces 25, 26 form (111)-faces, respectively. The tapered surfaces 27, 28 form (110)-faces, respectively.

With regard to sensitivity to the stress in the direction along the <110> crystal axis, a strain resistance coefficient (e.g., piezoresistance coefficient) is larger than that of sensitivity to the stress in the direction along the <100> crystal axis. Therefore, the stress generated in the direction along the <110> crystal axis is used for detecting a stress on the (110)-face rather than the stress generated in the direction along the <100> crystal axis. On the (110)-face, only one <110> crystal axis direction exists. In order to obtain a higher output to the crystal axis with higher sensitivity, the strain gauge resistors R1, R3 are disposed adjacent to the center of the diaphragm 23 with respect to the <110> crystal axis direction, and the strain gauge resistors R2, R4 are disposed adjacent to an outer end of the diaphragm 23 with respect to the <110> crystal axis direction.

As shown in FIG. 2, the chip adhesive 50 for bonding the bottom surface of the chip base 30 and the top surface of the stem 40 is provided by mixing a granular material 52 with an adhesive base material 51. The granular material 52 includes particles that are mainly made of a cross-linked resin. The adhesive base material 51 is mainly made of a resin. In FIG. 2, the thickness of the adhesive base material 51 and the size of the particles of the granular material 52 are enlarged for an illustration purpose.

In the present embodiment, the adhesive base material 51 is, for example, fluorosilicone rubber. The granular material 52 has low elasticity, and includes one of solid spherical particles (beads) and hollow spherical particles (micro balloon), which are mainly made of one of cross-linked polyacrylic ester, acrylonitrile-base resin, and phenol resin.

<Electric Structure>

Next, a schematic electric structure of the semiconductor pressure sensor 10 will be described with reference to FIG. 5.

Figure 5:
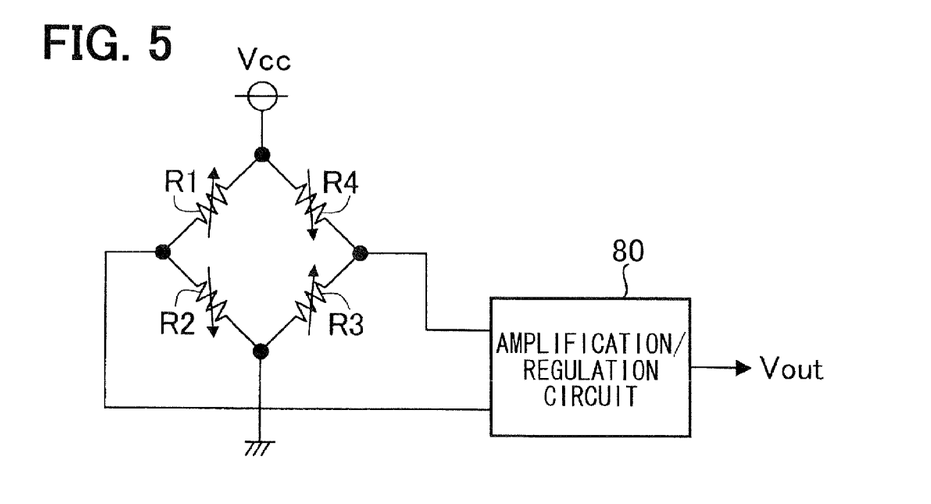
FIG. 5 is a schematic circuit diagram of the semiconductor pressure sensor according to the embodiment.

Referring to FIG. 5, in the pressure sensor 10, the strain gauge resistors R1 through R4 are connected in a full-bridge manner. A middle-point output terminal of the strain gauge resistors R1, R2 and a middle-point output terminal of the strain gauge resistors R3, R4 are connected to an amplification/regulation circuit 80. The amplification/regulation circuit 80 amplifies a difference of middle-point output voltages and outputs the amplified difference as a signal Vout. Also, the amplification/regulation circuit 80 regulates offset, gain and the like.

When pressure is applied to the diaphragm 23, a resistance of each of the strain gauge resistors R1 through R4 is changed in accordance with deformation of the diaphragm 23. The change in resistances appears as middle point output voltages, and the difference of the middle point output voltages is amplified in the amplification/regulation circuit 80 and outputted to an external device as the signal Vout.

For example, in a case where the pressure sensor 10 is employed as an exhaust pressure sensor of a vehicle, the signal Vout is fed to an electronic control unit (ECU) of the vehicle to calculate exhaust gas pressure.

<Experiment>

An experiment for obtaining the chip adhesive 50 capable of reducing the curve of a temperature property line of the sensor was carried out in the following manner. In the experiment, temperature nonlinearity of offset voltage (hereinafter, TNO), temperature nonlinearity of sensitivity (hereinafter, TNS) and non-linearity-pressure (hereinafter, NLP) and thermal hysteresis (hereinafter, TH) were measured.

First, the TNO will be explained.

The single-crystal silicon substrate 21 and the glass base 30 have different coefficients of thermal expansion. Therefore, if ambient temperature of the pressure sensor 10 changes, a thermal stress occurs between the silicon substrate 21 and the base 30. The thermal stress is transmitted to the strain gauge resistors R1 through R4 disposed on the diaphragm 23.

The strain gauge resistors R1, R3 are located adjacent to the center of the diaphragm 23, while the strain gauge resistors R2, R4 are located adjacent to the outer end of the diaphragm 23. Therefore, the magnitude of thermal stress applied to the strain gauge resistors R1, R3 is different from that of the thermal stress applied to the strain gauge resistors R2, R4 due to the difference of the arrangement locations. As a result, the difference of the thermal stresses is outputted as noise.

Figure 6:
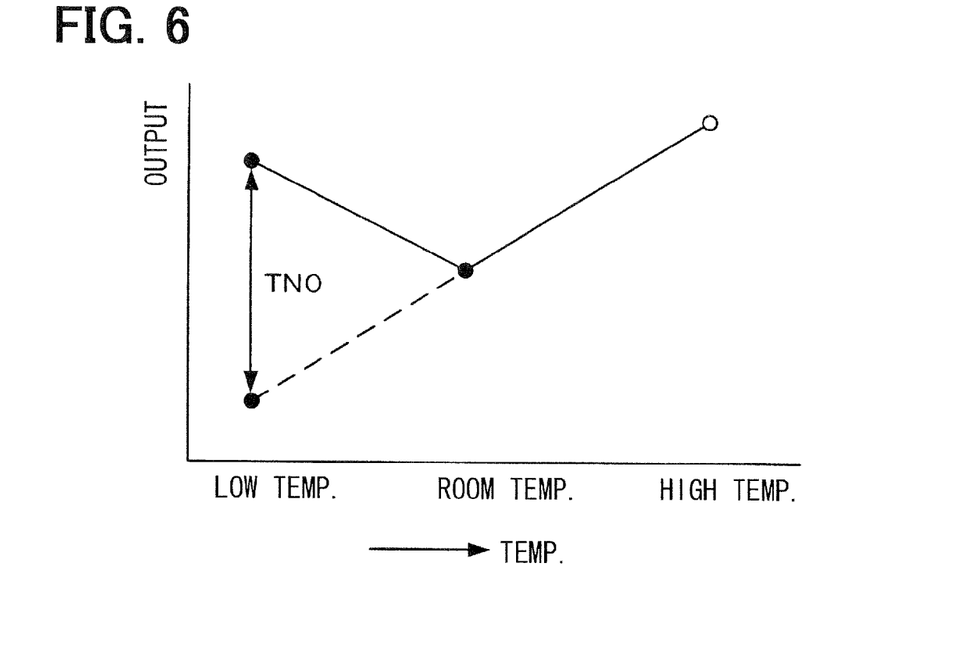
FIG. 6 is a graph showing a temperature property of offset of a sensor output according to the embodiment.

Further, the difference of the thermal stresses nonlinearly varies depending on the ambient temperature. Therefore, the offset of the sensor output relative to the temperature is curved. As shown in FIG. 6, in the temperature property line of the offset of the sensor output, the gradient between room temperature and a high temperature and the gradient between a low temperature and the room temperature are different. The difference is referred to as the TNO.

Particularly, in the pressure sensor 10, the strain gauge resistors R1, R3 are located adjacent to the center of the diaphragm 23, while the strain gauge resistors R2, R4 are located adjacent to the outer end of the diaphragm 23. If the granular material 52 mixed in the adhesive base material 51 is unevenly distributed, the strain gauge resistors R1 through R4 are differently affected. Therefore, the curve of the temperature property line of the offset of the sensor output increases, and hence a detection error will increase. The TNO is an important factor to be solved for improving detection accuracy. The magnitude of the TNO is indicated by μV/°C.

Next, the TNS will be explained.

Figure 7:
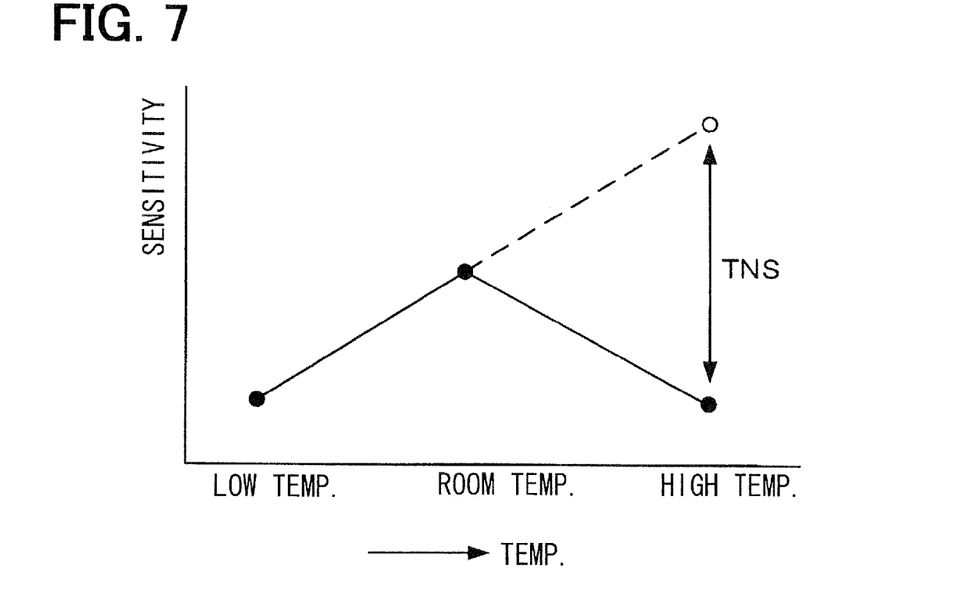
FIG. 7 is a graph showing a relationship between ambient temperature and sensor sensitivity according to the embodiment.

FIG. 7 shows a relationship between the ambient temperature and sensor sensitivity. As shown in FIG. 7, the sensor sensitivity reduces toward the low temperature and the high temperature from the room temperature. That is, the behavior of the temperature property indicates a two-way change. As shown by a dashed line in FIG. 7, assuming that an actual temperature property indicates a single-way change, the TNS is defined by the difference between the temperature property line having the single-way change and the temperature property line having the two-way change change. The magnitude of the TNS is indicated by ppm/°C.

Next, the NLP will be explained.

Figure 8:
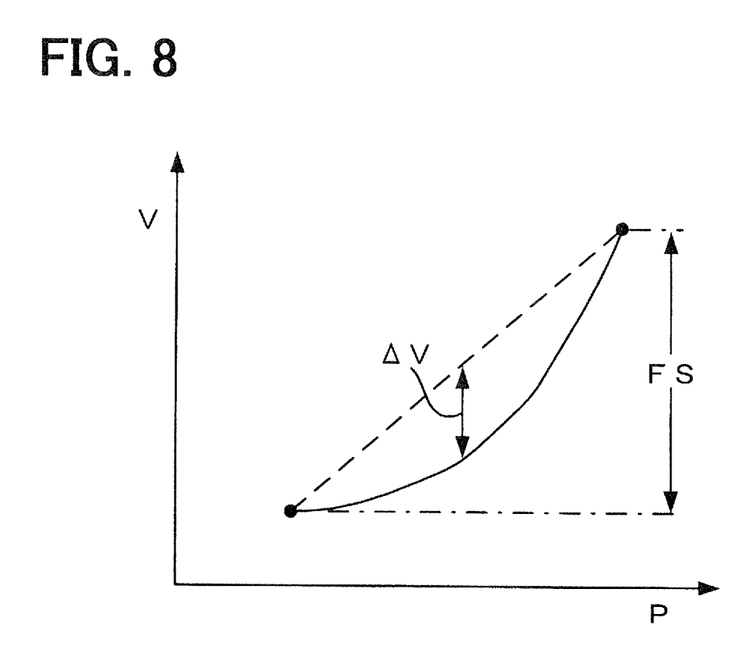
FIG. 8 is a graph showing a relationship between pressure and a sensor output voltage according to the embodiment.

FIG. 8 is a graph showing a relationship between the sensor output voltage V and pressure P. In a semiconductor pressure sensor in which multiple strain gauge resistors whose resistance changes by the strain resistive effect (e.g., piezoresistive effect) are disposed on a diaphragm, as in the pressure sensor 10, the sensor output voltage V and the pressure P have a nonlinear relationship, as shown in FIG. 8. The magnitude of the NLP is indicated by $100 \cdot \Delta V/FS$ (%) in which FS is a full-scale output voltage width.

In the experiment, three-types of semiconductor sensors, such as practical model M1, practical model M2, and practical model M3, were used as practical sensors. Also, a conventional semiconductor sensor was used as a comparative model.

In the practical models M1 through M3 and the comparative model, the base material of the chip adhesive is made of fluorosilicone rubber. In the practical model M1, the granular material mixed with the base material of the chip adhesive is solid spherical particles mainly made of cross-linked polyacrylic ester. In the practical model M2, the granular material is hollow spherical particles mainly made of acrylonitrile-base resin. In the practical model M3, the granular material is hollow spherical particles mainly made of phenol resin. In the comparative model, the granular material is solid spherical particles mainly made of divinylbenzen.

In all the practical models M1 through M3 and the comparative model, the output range was from 1.0 V to 4.5 V, and the gain was 275 times. With regard to the practical models M1, M3 and the comparative model, fourteen test pieces were used, respectively. With regard to the practical model M2, thirteen test pieces of the practical model M2 were used. Also, in all the practical models M1 through M3 and the comparative model, the communication hole under the diaphragm is not filled with the pressure transmitting medium.

The temperature properties of the aforementioned TNO, TSN, NLP and TH were measured when the ambient temperature was orderly set to −30 degrees Celsius as the low temperature, 25 degrees Celsius as the room temperature and 130 degrees Celsius as the high temperature, and applied pressure was changed from −40 kPa, 0 kPa, 50 kPa to 100 kPa at each of the ambient temperatures. Further, the temperature properties of the aforementioned TNO, TSN, NLP and TH were measured when the ambient temperature was lowered from 130 degrees Celsius to 25 degrees Celsius and the applied pressure was changed to each of the above pressures at each of the ambient temperatures. These measurements were carried out for each of the test pieces of the practical models M1 through M3 and the comparative model, and an average of the measurement results of each of the temperature properties was calculated for each of the models as the variation in the temperature property.

Figure 9A:
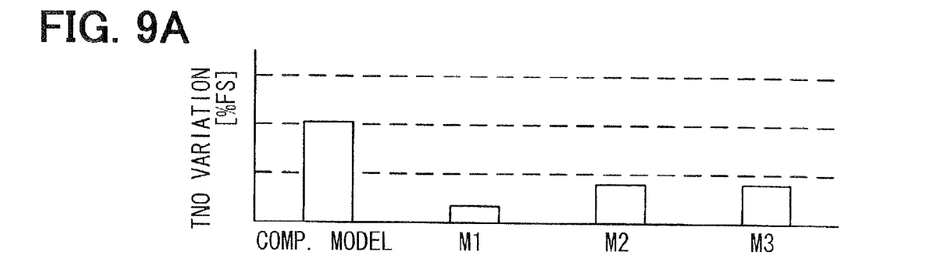
FIGS. 9A through 9E are graphs showing variations of temperature properties according to the embodiment.

FIGS. 9A through 9E show the calculated results. FIG. 9A shows the variation in the TNO [% FS]. As shown in FIG. 9A, with regard to the TNO variation, the practical model M1 has the minimum level and the practical models M2, M3 have the similar levels, while the comparative model has the maximum level. As such, it is appreciated that the TNO variation is reduced when the chip base 30 and the stem 40 are bonded with the chip adhesive 50 that is provided by the mixture of fluorosilicone rubber with the solid spherical particles mainly made of the cross-linked polyacrylic ester, and hence the detection accuracy of the pressure sensor 10 improves.

Figure 9B:
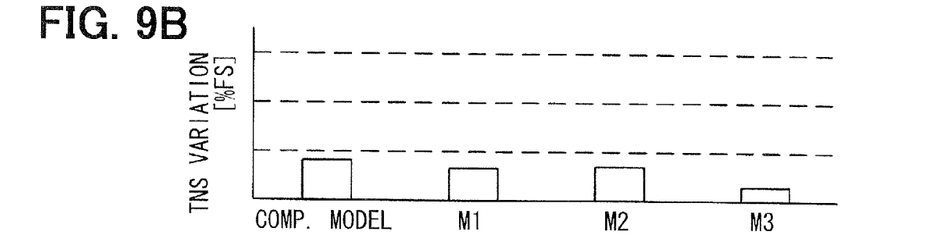

FIG. 9B shows the variation in the TNS [% FS]. As shown in FIG. 9B, with regard to the TNS variation, the practical model M3 has the minimum level, while the comparative model has the maximum level. The TNS variation of the practical model M1 is larger than that of the practical model M3 and the TNS variation of the practical model M2 is larger than that of the practical model M1. Yet, the TNS variations of both the practical models M1, M2 are smaller than that of the comparative model. As such, it is appreciated that the TSN variation is reduced when the chip base 30 and the stem 40 are bonded with the chip adhesive 50 that is provided by the mixture of fluorosilicone rubber with the hollow spherical particles mainly made of the phenol resin, and hence the detection accuracy of the pressure sensor 10 improves.

Figure 9C:
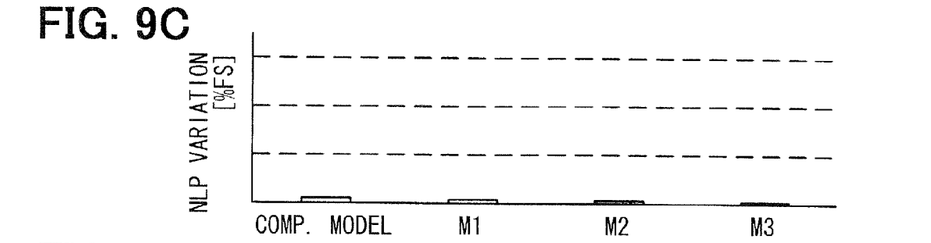

FIG. 9C shows the variation in the NLP [% FS]. As shown in FIG. 9C, with regard to the NLP variation, the practical model M3 has the minimum level, while the comparative model has the maximum level. The NLP variation of the practical model M2 is larger than that of the practical model M3 and the NLP variation of the practical model M1 is larger than that of the practical model M2. Yet, the TNS variations of both the practical models M1, M2 are smaller than that of the comparative model. Also, the difference of the variation is very small between the practical models M1 through M3. As such, it is appreciated that that the NLP variation is reduced when the mixture of the fluorosilicone rubber with one of the solid spherical particles mainly made of the cross-linked polyacrylic ester, the hollow spherical particles mainly made of the acrylonitrile-base resin, and the hollow spherical particles mainly made of the phenol resin is used as the chip adhesive 50. In those cases, the detection accuracy of the pressure sensor 10 improves.

Figure 9D:
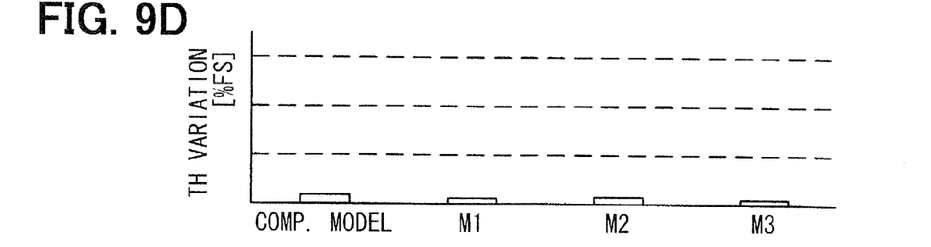

FIG. 9D shows the variation in the TH [% FS]. As shown in FIG. 9D, with regard to the TH variation, the practical model M3 has the minimum level, while the comparative model has the maximum level. The TH variation of the practical model M1 is larger than that of the practical model M3 and the TH variation of the practical model M2 is larger than that of the practical model M1. Yet, the TH variations of both the practical models M1, M2 are smaller than that of the comparative model. As such, it is appreciated that the TH variation is reduced when the chip base 30 and the stem 40 are bonded with the chip adhesive 50 provided by the mixture of the fluorosilicone rubber with the hollow spherical particles mainly made of the phenol resin, and hence the detection accuracy of the pressure sensor 10 improves.

Figure 9E:
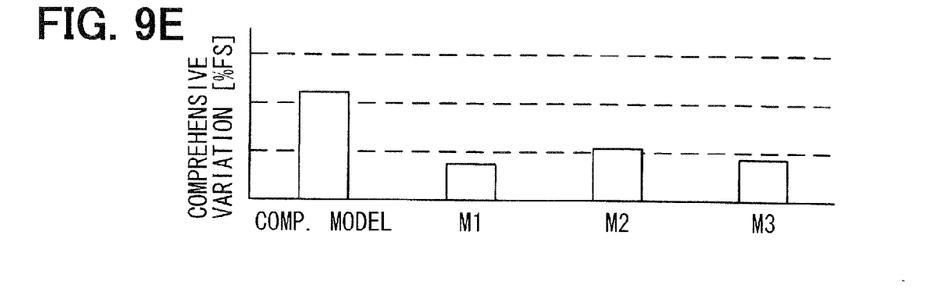

Moreover, the comprehensive variation was calculated based on the measurement results of the TNO variation, TNS variation, the NLP variation and the TH variation, as shown in FIG. 9E. The comprehensive variation was calculated by the method of square-root of sum of squares of the measurement results. As shown in FIG. 9E, the comprehensive variation of each of the practical models M1 through M3 is smaller than that of the comparative model. Particularly, the comprehensive variation of the practical model M1 is the smallest, and the comprehensive variations of the practical models M3, M2 are smaller next to that of the practical model M1.

According to the aforementioned test results, the variations in the temperature properties can be reduced in the practical models M1 through M3. Particularly, the TNO variation can be largely reduced in the practical models M1 through M3, as compared with that of the comparative model. In other words, the TNO variation is dominant in the temperature properties. Thus, it can be said that the detection error caused by the curves of the temperature property lines can be effectively reduced by reducing the TNO variation.

Accordingly, the chip adhesive provided by the mixture of the fluorosilicone rubber with the solid spherical particles mainly made of the cross-linked polyacrylic ester can be used as the example of the chip adhesive 50. In the pressure sensor 10 using such the chip adhesive, the detection error caused by the curves of the temperature property lines can be reduced.

Further, the chip adhesive provided by the mixture of the fluorosilicone rubber with the hollow spherical particles mainly made of the acrylonitrile-base resin and the chip adhesive provided by the mixture of the fluorosilicone rubber with the hollow spherical particles mainly made of the phenol resin can be used as other examples of the chip adhesive 50. Also in the pressure sensor 10 using such the chip adhesive, the detection error caused by the curves of the temperature property lines can be reduced.

(Other Embodiments)

(1) In the aforementioned embodiment, the fluorosilicone rubber is exemplarily used as the base material 51 of the chip adhesive 50. Alternatively, silicone rubber or fluororubber may be used as the base material. Also in such a case, the similar advantageous effect can be achieved.

(2) In the aforementioned embodiment, the solid spherical particles of the granular material 52 are mainly made of the cross-linked polyacrylic ester.

Alternatively, the solid spherical particles of the granular material 52 may be made of acrylonitrile-base resin or phenol resin. Also in such a case, the similar advantageous effect can be achieved.

(3) In the aforementioned embodiment, the hollow spherical particles of the granular material 52 are mainly made of acrylonitrile-base resin or phenol resin. Alternatively, the hollow spherical particles of the granular material 52 may be mainly made of the cross-linked polyacrylic ester. Also in such a case, the similar advantageous effect can be achieved.

(4) The sensor chip 20 employs the single-crystal silicon substrate as an example of the semiconductor substrate 21. Alternatively, the sensor chip 20 may employ a poly-crystal silicon substrate or a silicon-on-insulator (SOI) substrate as the semiconductor substrate 21.

(5) In the aforementioned embodiment, the physical quantity sensor 10 is exemplarily employed as the pressure sensor. The physical quantity sensor 10 may be employed as any other sensors having a possibility where the temperature property line may be curved, such as a flow sensor, an acceleration sensor, a yaw rate sensor and collision sensors.

Additional advantages and modifications will readily occur to those skilled in the art. The invention in its broader term is therefore not limited to the specific details, representative apparatus, and illustrative examples shown and described.

What is claimed is:

1. A semiconductor physical quantity sensor comprising:
a sensor chip including a semiconductor substrate and a chip base that supports the semiconductor substrate, the semiconductor substrate being provided with a sensing portion for detecting a physical quantity;
a support member supporting the sensor chip; and
an adhesive bonding the chip base with the support member, wherein
the adhesive is provided by a mixture of an adhesive base material mainly made of a resin and a granular material mainly made of a cross-linked resin, and
the cross-linked resin is a cross-linked polyacrylic ester.

2. A semiconductor physical quantity sensor comprising:
a sensor chip including a semiconductor substrate and a chip base that supports the semiconductor substrate, the semiconductor substrate being provided with a sensing portion for detecting a physical quantity;
a support member supporting the sensor chip; and
an adhesive bonding the chip base with the support member, wherein
the adhesive is provided by a mixture of an adhesive base material mainly made of a resin and a granular material mainly made of a cross-linked resin, and
the granular material includes hollow spherical particles.

3. The semiconductor physical quantity sensor according to claim 2, wherein the cross-linked resin is a phenol resin.

4. A semiconductor physical quantity sensor comprising:
a sensor chip including a semiconductor substrate and a chip base that supports the semiconductor substrate, the semiconductor substrate being provided with a sensing portion for detecting a physical quantity;
a support member supporting the sensor chip; and
an adhesive bonding the chip base with the support member, wherein
the adhesive is provided by a mixture of an adhesive base material mainly made of a resin and a granular material mainly made of a cross-linked resin, and
the granular material includes solid spherical particles.

5. The semiconductor physical quantity sensor according to claim 2, wherein the cross-linked resin is an acrylonitrile-base resin.

6. A semiconductor physical quantity sensor comprising:
a sensor chip including a semiconductor substrate and a chip base that supports the semiconductor substrate, the semiconductor substrate being provided with a sensing portion for detecting a physical quantity;
a support member supporting the sensor chip; and
an adhesive bonding the chip base with the support member, wherein
the adhesive is provided by a mixture of an adhesive base material mainly made of a resin and a granular material mainly made of a cross-linked resin,
the adhesive base material is mainly made of a rubber-base element, and
the rubber-base element is a fluorosilicone rubber.

7. A semiconductor physical quantity sensor comprising:
a sensor chip including a semiconductor substrate and a chip base that supports the semiconductor substrate, the semiconductor substrate being provided with a sensing portion for detecting a physical quantity;
a support member supporting the sensor chip; and
an adhesive bonding the chip base with the support member, wherein
the adhesive is provided by a mixture of an adhesive base material mainly made of a resin and a granular material mainly made of a cross-linked resin,
the adhesive base material is mainly made of a rubber-base element, and
the rubber-base element is a silicone rubber.

8. A semiconductor physical quantity sensor comprising:
a sensor chip including a semiconductor substrate and a chip base that supports the semiconductor substrate, the semiconductor substrate being provided with a sensing portion for detecting a physical quantity;

a support member supporting the sensor chip; and an adhesive bonding the chip base with the support member, wherein the adhesive is provided by a mixture of an adhesive base material mainly made of a resin and a granular material mainly made of a cross-linked resin, the adhesive base material is mainly made of a rubber-base element, and the rubber-base element is a fluororubber.

9. The semiconductor physical quantity sensor according to claim 1, wherein the support member is made of ceramic.

10. The semiconductor physical quantity sensor according to claim 1, wherein the semiconductor substrate is a silicon substrate, the silicon substrate has a recess formed by etching a (110)-face of the silicon substrate, and the sensing portion includes a diaphragm defining a bottom surface of the recess and a plurality of strain gauge resistors disposed on the diaphragm.

* * * * *